United States Patent
Greene et al.

(10) Patent No.: US 9,168,900 B2
(45) Date of Patent: *Oct. 27, 2015

(54) BRAKE MONITORING SYSTEM WITH MULTIPLE INPUTS

(75) Inventors: James L. Greene, Kansas City, MO (US); David G. Engelbert, Kansas City, MO (US); Jerry J. Donovan, Shawnee, KS (US); Thomas D. Mullikin, Holt, MO (US)

(73) Assignee: Haldex Brake Corporation, Kansas City, MO (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/489,742

(22) Filed: Jun. 6, 2012

(65) Prior Publication Data

US 2012/0330502 A1    Dec. 27, 2012

Related U.S. Application Data

(63) Continuation-in-part of application No. 13/337,904, filed on Dec. 27, 2011, now Pat. No. 8,204,668, which is a continuation of application No. 12/324,236, filed on Nov. 26, 2008, now Pat. No. 8,108,118.

(51) Int. Cl.
*B60T 7/00* (2006.01)
*B60T 7/18* (2006.01)
*B60T 17/22* (2006.01)

(52) U.S. Cl.
CPC .. *B60T 7/18* (2013.01); *B60T 17/22* (2013.01)

(58) Field of Classification Search
CPC ......... B60T 7/12; B60T 8/175; B60T 8/1755; B60T 8/17636; B60T 8/17616; B60T 7/18; B60T 17/22

USPC .......................................................... 701/78
See application file for complete search history.

(56) References Cited

U.S. PATENT DOCUMENTS

| | | | |
|---|---|---|---|
| 2,451,139 A * | 10/1948 | Williams et al. | .................. 303/8 |
| 4,487,060 A | 12/1984 | Pomeroy | |
| 4,593,954 A | 6/1986 | Campanini | |
| 4,877,294 A | 10/1989 | Kuhn et al. | |
| 4,907,842 A | 3/1990 | Goldfein | |

(Continued)

FOREIGN PATENT DOCUMENTS

| JP | 2007196732 A | 8/2007 |
|---|---|---|
| WO | 2008025404 A1 | 5/2008 |

OTHER PUBLICATIONS

Brake-Stroke Indicator Design Guideline for Cam or Disc Air-Brake Actuators.; SAE international; Sep. 17, 2001; http://standards.sae.org/j1953_200109/.*

*Primary Examiner* — John Q Nguyen
*Assistant Examiner* — Michael Whalen
(74) *Attorney, Agent, or Firm* — St. Onge Steward Johnston & Reens LLC (57) ABSTRACT

An air brake monitoring system for monitoring a pressure of the system and providing various alarms and/or warnings to a user including tire and brake status/alarms and providing for a backup alarm. The air brake monitoring system configurable to function with the existing wiring of the vehicle and including an air brake monitoring device to be positioned in the vicinity of a brake valve. The air brake monitoring system is further provided to monitor the electrical stoplight power transmitted to the ABS brakes as well as the vehicle static/dynamic condition.

16 Claims, 9 Drawing Sheets

(56) References Cited

U.S. PATENT DOCUMENTS

| | | |
|---|---|---|
| 5,042,883 A | 8/1991 | McCann et al. |
| 5,043,700 A | 8/1991 | Rymut |
| 5,172,958 A * | 12/1992 | Sell ............... 303/9.76 |
| 5,286,095 A | 2/1994 | Sell et al. |
| 5,333,940 A | 8/1994 | Topfer |
| 5,450,930 A * | 9/1995 | Martens et al. ......... 188/1.11 L |
| 5,549,362 A | 8/1996 | Broome |
| 5,572,187 A | 11/1996 | Williford |
| 6,203,118 B1 * | 3/2001 | Takayama et al. ......... 303/113.4 |
| 6,452,489 B1 | 9/2002 | Ehrlich |
| 6,540,308 B1 * | 4/2003 | Hilberer ............... 303/6.01 |
| 7,280,898 B2 | 10/2007 | Lesesky et al. |
| 7,823,441 B2 | 11/2010 | Beverly et al. |
| 2007/0112476 A1 * | 5/2007 | Obradovich ............... 701/1 |
| 2008/0040013 A1 * | 2/2008 | Detlefs et al. ............... 701/78 |
| 2009/0280959 A1 | 11/2009 | Bensch et al. |
| 2010/0106385 A1 | 4/2010 | Ramler et al. |
| 2010/0156619 A1 | 6/2010 | Wright |

\* cited by examiner

BRAKE MONITORING SYSTEM WITH MULTIPLE INPUTS

CROSS-REFERENCE TO RELATED APPLICATIONS

This application is a continuation-in-part application of U.S. patent application Ser. No. 13/337,904, filed on Dec. 27, 2011 now U.S. Pat. No. 8,204,668, which is a continuation of U.S. patent application Ser. No. 12/324,236, filed on Nov. 26, 2008, now issued U.S. Pat. No. 8,108,118. The content of all prior applications is incorporated herein by reference.

FIELD OF THE INVENTION

The invention relates to a system and method for monitoring an air brake system, and more particularly to a system and method for monitoring air pressure and power in an air brake system receiving multiple different types of inputs.

BACKGROUND OF THE INVENTION

Air operated braking systems have long been utilized to control commercial vehicles such as trucks and trailers, which typically have large gross vehicle weights in a safe and effective manner. The considerable inertial mass of these heavy-duty vehicles in combination with the high speeds at which they travel requires a braking system which responds rapidly with substantial braking power. A spring brake actuator is used in air operated braking systems to provide the force necessary for braking a heavy-duty vehicle.

In a typical spring brake system, braking force may be applied in a number of ways. For normal braking operation, compressed air is introduced into the brake chamber, which co-acts with a diaphragm, such as, for example, an elastomeric diaphragm, and a push rod to apply braking force. For emergency and/or parking brake applications, a power spring stores potential energy and exerts the large force required for braking in case of loss of air pressure or air pressure failure. During normal driving operation, compressed air acts on a diaphragm to compress the power spring to maintain the braking system in a released position. When the compressed air is released, the force of the power spring overcomes the force of the compressed air such that the power spring expands co-acting with the diaphragm and push rod. This in turn, applies a braking force in case of failure of the system air pressure or exhaustion of compressed air while the vehicle is not in operation or is parked.

A loss of compressed air in typical air brake systems means that the power spring applies a braking force to prevent the vehicle from moving. Accordingly, some systems have provided for an emergency/supply pressure line to the braking system such that, in the event of a loss of air pressure on the primary service/control line to the brake system, compressed air will still flow to the brake via an emergency/supply air pressure line. While this configuration will provide a functioning system in the event of catastrophic failure of the service/control line, this system will not provide information to the driver regarding the efficiency of the braking system. For example, the service/control line may suffer from a leaky connection causing substantial leaking of the compressed air. There may be enough air pressure in the system to allow for operation of the vehicle, but the vehicle may suffer from brake drag, meaning the air pressure is not high enough to completely overcome the power spring such that the brake is partially applied during normal driving operation.

Many problems relating to the air supply to both the service and emergency systems occur with prior art systems. For example, with current systems, the emergency/supply line extends to the braking mechanism adjacent to the wheel, and is therefore, subject to damage. If the emergency/supply line becomes damaged, there is no way to determine this if the service/control line continues to function, even if it is only partially functional. Likewise, incorrect connection of supply hoses when a braking system is removed for servicing and re-installed may occur. If, for example, the emergency/supply line is incorrectly re-installed, upon failure of the primary supply line, the braking system will not function. Another air related problem that exists for prior art systems is the provision of service/control air pressure to the trailer when the brakes are not applied. If, for example, there is an air leak from the tractor to the trailer on the service/control pressure line at all times. Still another problem that prior art systems face is the service/control and emergency/supply lines can deliver inadequate pressure due to obstructions or leaks within the air lines. If, for example, moisture in a pressure line freezes and obscures the air pressure line or an air line cracks or gets damaged by road debris.

Another problem that prior art systems face is the provision of stoplight power to the trailer when the brakes are applied. If, for example, the stoplight switch is faulty, stoplight power can be present at the trailer without service/control pressure.

Additional problems with prior art systems include the lack of input data to the brake monitor. For example, prior art systems do not provide wheel speed data on the power line from a faulty ABS controller. If, for example, the ABS controller has failed or the wheel speed sensors are faulty or have an excessive gap with the exciter ring, then the ABS ECU cannot detect or transmit individual wheel speeds. Similarly, incorrect connection of the 7-conductor electrical connection to the towed vehicle leads to problems in prior art systems. If, for example, the connection is an open circuit, the Anti-Lock Braking System (ABS) will not function as well as the stoplights during a braking event.

Still another problem that prior art systems face is incorrect air connections to the dolly that connects two trailers together. Each dolly has one service/control and one emergency/supply pressure line to the lead trailer as well as one service/control and one emergency/supply pressure line to the towed trailer. There are twenty-four different combinations these pressure lines on the dolly can be connected between two trailers with only one combination being correct. Incorrect connection of service/control or emergency/supply hoses will cause a various number of failure conditions. One being no brakes when the service/control line has pressure the other being wheel lockup when the emergency/supply line has no pressure. These failure conditions can be on any one or all wheels of the vehicle. Likewise, another problem that prior art systems face is incorrect connection of supply hoses when a braking system is removed for servicing and re-installed. If, for example, the emergency/supply line is incorrectly re-installed, upon failure of the primary supply line, the braking system will not function. These failure conditions can be on any one or all wheels of the vehicle.

Another problem that prior art systems face is the service/control and emergency/supply line glad-hand shut-off valves at the rear of the trailer. These valves require an open state when towing another vehicle and require a closed state when they are the rear vehicle on a single or multiple trailer combination. Incorrect positioning of the valves will cause the alarm, warning lamp or wireless message and/or signal to be generated. If, for example, the service line glad-hand shut-off valve is shut off to the towed vehicle causing a failure of the service/control line, the service braking system will not function.

As braking systems become more integrated, pneumatic systems are increasingly including electrical components and distribution lines for transmitting power and data. Various electrical components require electrical power to operate correctly including, lamps, electronic circuits, ABS (Anti-lock Braking System) and EBS (Electronic Braking System) to name a few. A loss of electrical power may cause these systems to be non-functional, which would generally be apparent. However, in a situation with reduced or relatively lower power, the systems may not be completely prevented from functioning, but system function and operation may be substantially impaired.

SUMMARY OF THE INVENTION

Accordingly, it is desired to provide a system and method for monitoring service/control line pneumatic pressure to a braking system.

It is further desired to provide a system and method for monitoring emergency/supply line pneumatic pressure to a braking system.

It is still further desired to provide a system and method for monitoring electrical stoplight power for an ABS braking system.

It is still further desired to provide a system and method for reliably monitoring various system parameters and providing the inputs to the brake monitor.

It is still further desired to provide a system and method for reliably monitoring wheel speed and/or wheel rotation from the ABS braking system.

These and other objects are achieved, in one advantageous embodiment, by the provision of an air brake monitoring system that monitors the pressure in both the service/control line and the emergency/supply line. The system may include, pressure sensors for measuring the various line pressures, and a processor for receiving the various pressure measurements. The processor may be programmed to compare the actual measured pressure of a particular line with a desired threshold pressure level setting.

In one embodiment, if the actual measured pressure deviates from the setting by more than a selected percentage or amount (e.g. exceeds the threshold level by a selected amount), then the system can provide various indications to the operator.

It is further contemplated that monitoring device(s) may be used to measure various vehicle parameters, which can be transmitted to a monitoring device (e.g., a brake monitoring device). Some of the data transmitted may include monitoring of tire pressure, tire inflation and tire temperature. A monitoring device(s) may further monitor and transmit brake temperature and brake stroke. Any or all of these inputs may be used by the monitoring device in the control of the braking system and/or in the generation of an indication.

The system may include pressure switches or transducers for the various line pressures and a processor for receiving the various pressure switch or transducer signals. The processor may be programmed to receive the pressure switch or transducer signals of a particular pressure line.

Some of various alarms that may be transmitted to the driver or central monitoring station may include: warning of potential brake drag (e.g. due to low-pressure caused by air leakage); warning of air system leaks in the emergency/supply line; warning of incorrect air line connections and air system false charging of dolly and/or trailer; warning of closed shut-off or restricted valves, incorrect state of trailer glad-hand shut off valves warning, incorrect dolly connection warning, closed brake valve warning, incorrect vehicle static/dynamic condition, tire pressure warning, tire temperature warning, tire inflation warning, brake temperature warning, and/or brake stroke warning.

The system may further provide for monitoring of electrical power levels on various electrical lines used, for example, for stop lamps and/or a variety of electrical devices and equipment.

In an advantageous embodiment, the system is provided with an Air Brake Monitoring System (ABMS). The ABMS may be provided with a coupler for connecting to, for example, in a tractor-trailer configuration, ABS power from the trailer. The power is fed into the ABMS, which may be provided as an enclosure that may be mounted adjacent to or in the vicinity of the vehicle braking system. In addition to the ABMS, an ABS valve is coupled to the ABMS via a spring brake pressure line and a service/control brake pressure line. The ABS valve further receives ABS power from the ABMS. It should be noted that this is just one advantageous configuration and that it is contemplated that many differing configurations of the interconnections may be effectively utilized.

It is further contemplated that the ABS valve may be provided with a Electronic Control Unit (ECU) for processing various inputs relating to the braking system.

The monitoring system may transmit information and/or data to the driver via a data line(s), or may utilize data transmission by means of a Power Line Carrier (PLC). In other words, rather than providing a dedicated data line(s) for transmission of monitoring data, it is contemplated that the data may be sent over the existing ABS electrical power lines.

When using the PLC, the air brake monitoring system may turn on all ABS warning lamps as necessary; turn on in-cab ABS lamps; turn on an alarm to resolve issues relating to viewing dolly ABS warning lamp; and allows a system status to be broadcast over the PLC.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

In one advantageous embodiment a brake monitoring system is provided comprising a service/control pressure line coupled to a source of pressurized air, an emergency/supply pressure line coupled to the source of pressurized air and a brake valve. The system further comprises an air brake monitoring device having a processor, which is connected to the service/control pressure line and the emergency/supply pressure line. The system is provided such that the air brake monitoring device measures a pressure of the service/control pressure line and the air brake monitoring device compares the measured pressure of the service/control pressure line to a pressure set point. The air brake monitoring device further generates a service/control indication when the measured pressure exceeds a threshold value corresponding to a deviation from the pressure set point.

In another advantageous embodiment a method for monitoring an air brake system is provided comprising the steps of coupling a service/control pressure line to a source of pressurized air and coupling an emergency/supply pressure line to the source of pressurized air. The method also includes the steps of coupling a brake valve to the service/control and emergency/supply pressure lines and coupling an air brake monitoring device to the service/control and emergency/supply pressure lines. Finally, the method includes the steps of measuring a pressure of the service/control pressure line, comparing the measured pressure to a pressure set point, and generating a service/control indication when the measured pressure exceeds a threshold value corresponding to a deviation from the pressure set point.

In another advantageous embodiment a method for monitoring an air brake system is provided comprising the steps of monitoring the individual wheel speeds or wheel rotations on the power line. The method also includes controlling in-cab lamp trailer ABS lamp, the trailer mounted ABS lamp and alarm as well as Global Positioning System (GPS)/wireless transmitter and/or receiver means based on the static or dynamic condition of the vehicle. Finally, the method includes the steps of measuring the vehicle dynamics in conjunction with a pressure of the service/control pressure line, comparing the measured pressure to a pressure set point, and generating a service/control indication when the measured pressure exceeds a threshold value corresponding to a deviation from the pressure set point.

In another advantageous embodiment a method for monitoring an air brake system is provided comprising the steps of monitoring the individual wheel speeds or wheel rotations on the power line. The method also includes controlling in-cab lamp trailer ABS lamp, the trailer mounted ABS lamp and alarm as well as GPS or other wireless means based on the static or dynamic condition of the vehicle. Finally, the method includes the steps of measuring the vehicle dynamics in conjunction with a pressure of the emergency/supply pressure line, comparing the measured pressure to a pressure set point, and generating an emergency/supply indication when the measured pressure exceeds a threshold value corresponding to a deviation from the pressure set point.

In another advantageous embodiment a method for monitoring an air brake system is provided comprising the steps of monitoring the stoplight power. The method also includes controlling in-cab lamp trailer ABS lamp, the trailer mounted ABS lamp and alarm as well as GPS or other wireless signals based on the presence of stoplight power in conjunction with a pressure of the service/control pressure line, comparing the measured pressure to a pressure set point, and generating a service/control indication when the measured pressure exceeds a threshold value corresponding to a deviation from the pressure set point.

In still another advantageous embodiment a brake monitoring system is provided comprising a service/control pressure line, an emergency/supply pressure line and a brake valve coupled to the service/control pressure line and the emergency/supply pressure line. The system also includes a brake monitoring device coupled to the service/control pressure line and the emergency/supply pressure line, the monitoring device monitoring the pressure of both the service/control pressure line and the emergency/supply pressure line. The system is provided such that the brake monitoring device compares the measured pressure of the service/control pressure line and the emergency/supply pressure line to a pressure set point and the brake monitoring device generates an indication based on the measured pressure.

In still another advantageous embodiment a brake monitoring system is provided comprising a service/control pressure line, an emergency/supply pressure line and a brake valve coupled to the service/control pressure line and the emergency/supply pressure line. The system also includes a monitoring device coupled to the service/control pressure line and the emergency/supply pressure line, the monitoring device monitoring the pressure of both the service/control pressure line and the emergency/supply pressure line. The system is provided such that the monitoring device is coupled to a measurement device and the monitoring device generates a warning indication for at least one of the following conditions: brake drag warning, emergency/supply pressure line warning, service/control pressure line warning, loss of stoplight power warning, incorrect state of trailer glad-hand shut off valves warning, incorrect dolly connection warning, incorrect air connection warning, closed brake valve warning, incorrect vehicle static/dynamic condition, tire pressure warning, tire temperature warning, tire inflation warning, brake temperature warning, and brake stroke warning.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Stand-Alone Configuration

Figure 1A:
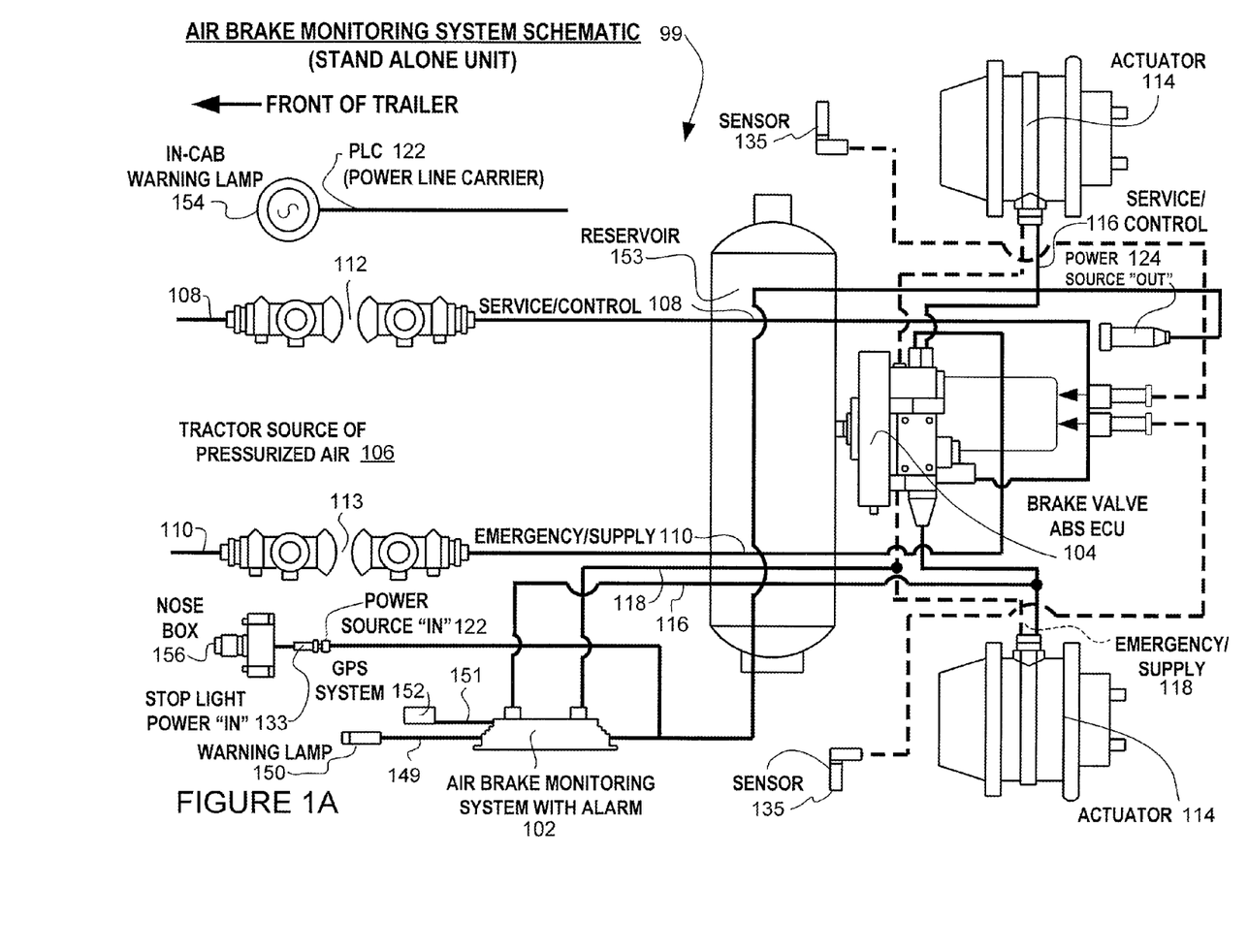
FIGS. 1A and 1B are diagrams of a standalone air brake monitoring system.
Figure 1B:
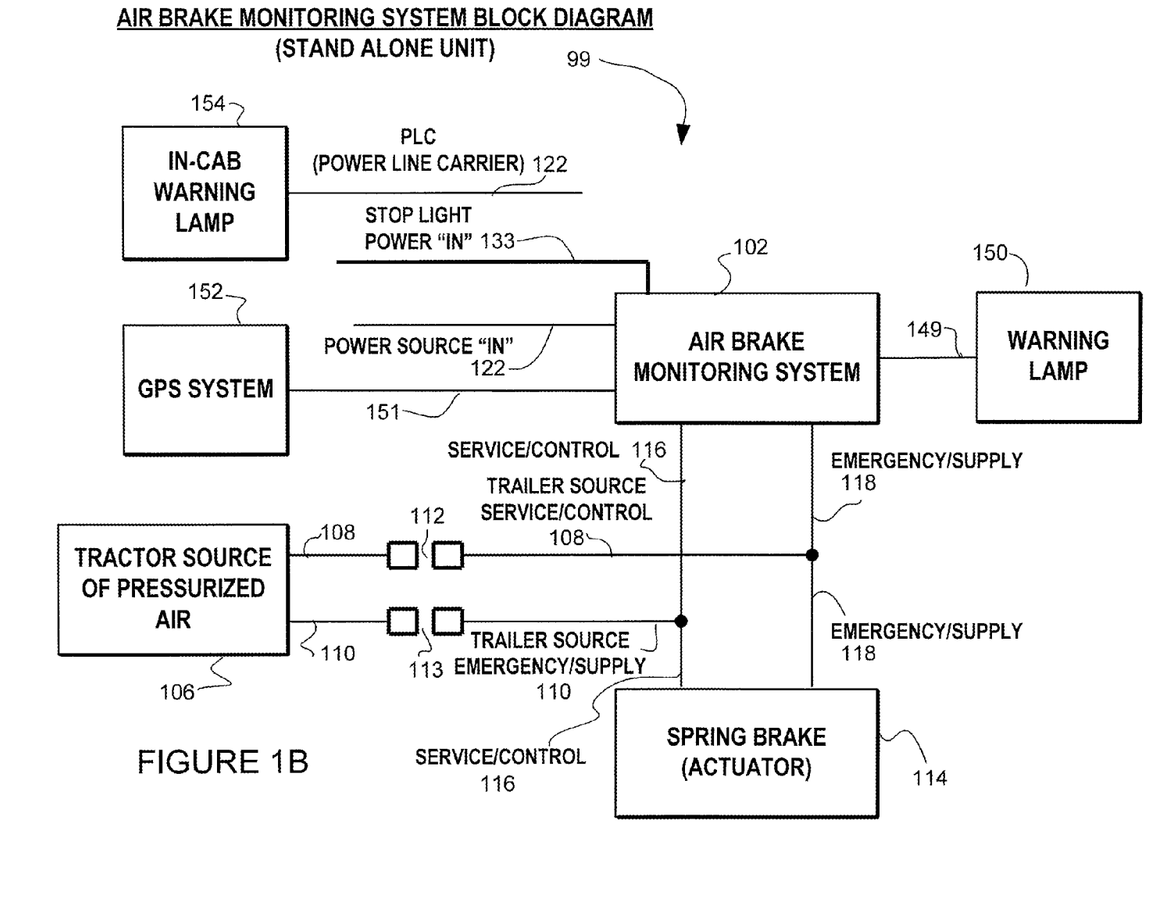

Referring now to 1A and 1B. FIGS. 1A and 1B depict a stand-alone air brake monitoring system 99 that generally comprises an air brake monitoring device 102. The standalone air brake monitoring system 99 is designed to monitor the status of an air brake system, such as, for example, an air brake system.

Also provided is a source of pressurized air 106, which may be positioned on the tractor portion of a tractor-trailer arrangement. The source of pressurized air 106 is coupled to air brake monitoring device 102 via service/control pressure line 108 and an emergency/supply pressure line 110. Pressure line couplings 112 and 113 as is known in the art, is illustrated that couples the service/control pressure line 108 and emergency/supply pressure line 110 located on the tractor portion with the service/control pressure line 108' and the emergency/supply pressure line 110' located on the trailer portion.

In this particular embodiment of the present invention, two pressure lines are used to provide pressurized air to air brake monitoring device 102 and brake valve 104. In the event that one of the pressure lines (116', 118') become damaged, such as for example, becoming severed or damages to the extent that an insufficient quantity of pressurized air cannot be transmitted to brake valve 104 for operation of the vehicle brake (not shown), a redundant pressure line is provided such that the vehicle may continue to operate as is known in the art. A problem with known systems is that they may become damaged but are still able to provide enough pressurized air to allow functioning of the vehicle brake however, this is no indication to the user/driver that the system is not functioning properly. This can lead to premature failure of the brake system. For example, if a pressure line becomes damaged or begins to leak due to corrosion and/or wear, enough pressurized air may still be provided to operate the vehicle brake, however the relative low-pressure situation only partially disengages the vehicle brake such that during normal operation the brake is partially applied. This results in excessive wear on the brakes and excessive cycling (almost continuous running) of the source of pressurized air 106. Also, the vehicle itself will have to burn excessive amounts of fuel to overcome the additional frictional force of the partially applied brakes (e.g. brake drag and potential wheel end fire or even trailer fire). All these result in substantially increased operating cost, both in early and unnecessary repair and replacement cost for worn parts and additional fuel costs, insurance cost if trailer fire due to lose of trailer and the trailer contents which are a substantial portion of the vehicle operating costs.

Figure 4A:
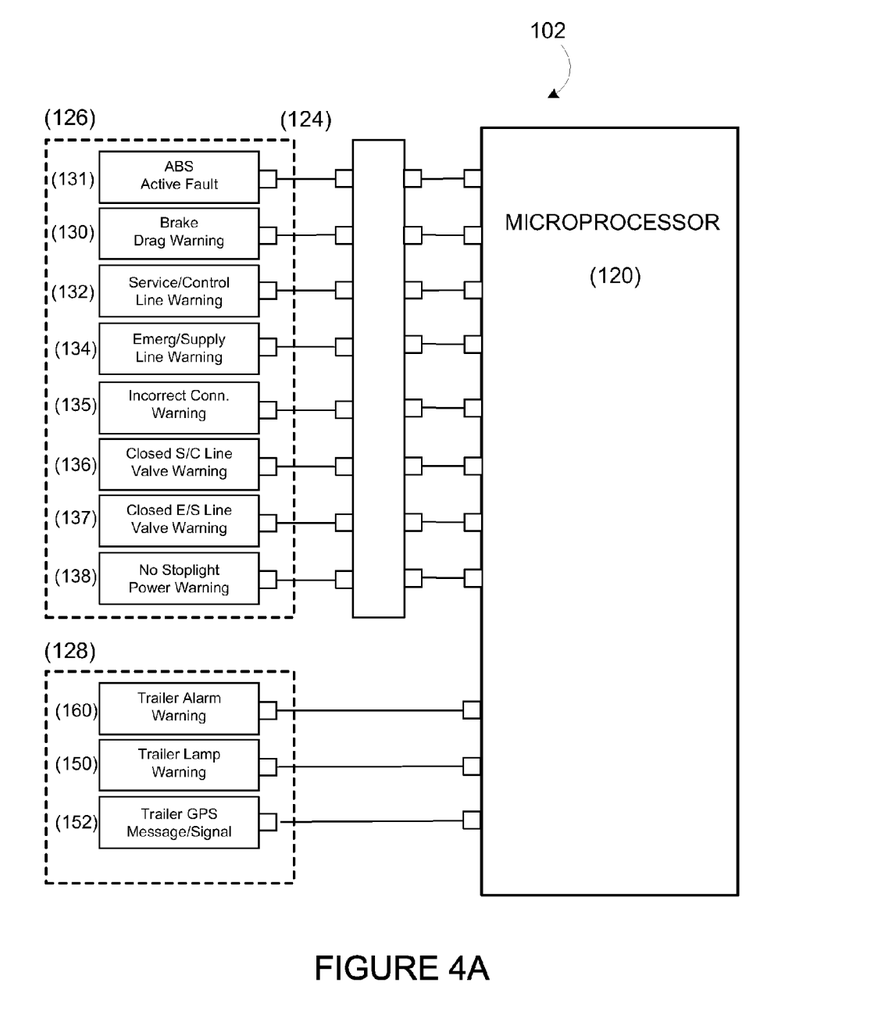
FIG. 4A is a block diagram of various warning inputs to the microprocessor.

Accordingly, the air brake monitoring device 102 monitors the actual pressure of both the device service/control pressure line 116', which corresponds to the pressure in the service/control pressure line 108'; and the device emergency/supply pressure line 118', which corresponds to the pressure in the emergency/supply pressure line 110'. Air brake monitoring device 102 is provided with a pressure set point against which the actual measured pressures may be compared by a processor 120 (FIG. 4). It is contemplated that if the actual measured pressure differs from the set point, an alarm(s), in-cab trailer warning lamp 154, warning lamp 150 and GPS/wireless transmitter and/or receiver 152 messages may be generated. In still another embodiment, it is contemplated that a range of pressures may be acceptable such that an alarm will only be generated if the measured pressure exceeds a threshold value corresponding to a maximum allowable deviation. The threshold value may be selected and varied as desired.

Also provided in FIGS. 1A and 1B is power line carrier 122, which is connectable to air brake monitoring device 102. It is contemplated that power line carrier 122 may comprise any typical ABS power connection. Air brake monitoring device 102 may further monitor stoplight power (voltage) provided on stoplight power 133 and compare that measured value to service/control pressure. If the actual measured value differs from or exceeds a maximum allowable deviation, an alarm(s), in-cab trailer warning lamp 154, warning lamp 150 and GPS/wireless transmitter and/or receiver 152 messages may be generated. Air brake monitoring device 102 is further coupled to brake valve 104 via device power line 124 (which includes stoplight power 133) to provide electrical power and control to and receive data and/or information from brake valve 104.

Air Brake Monitoring System in Conjunction with ABS

Figure 2A:
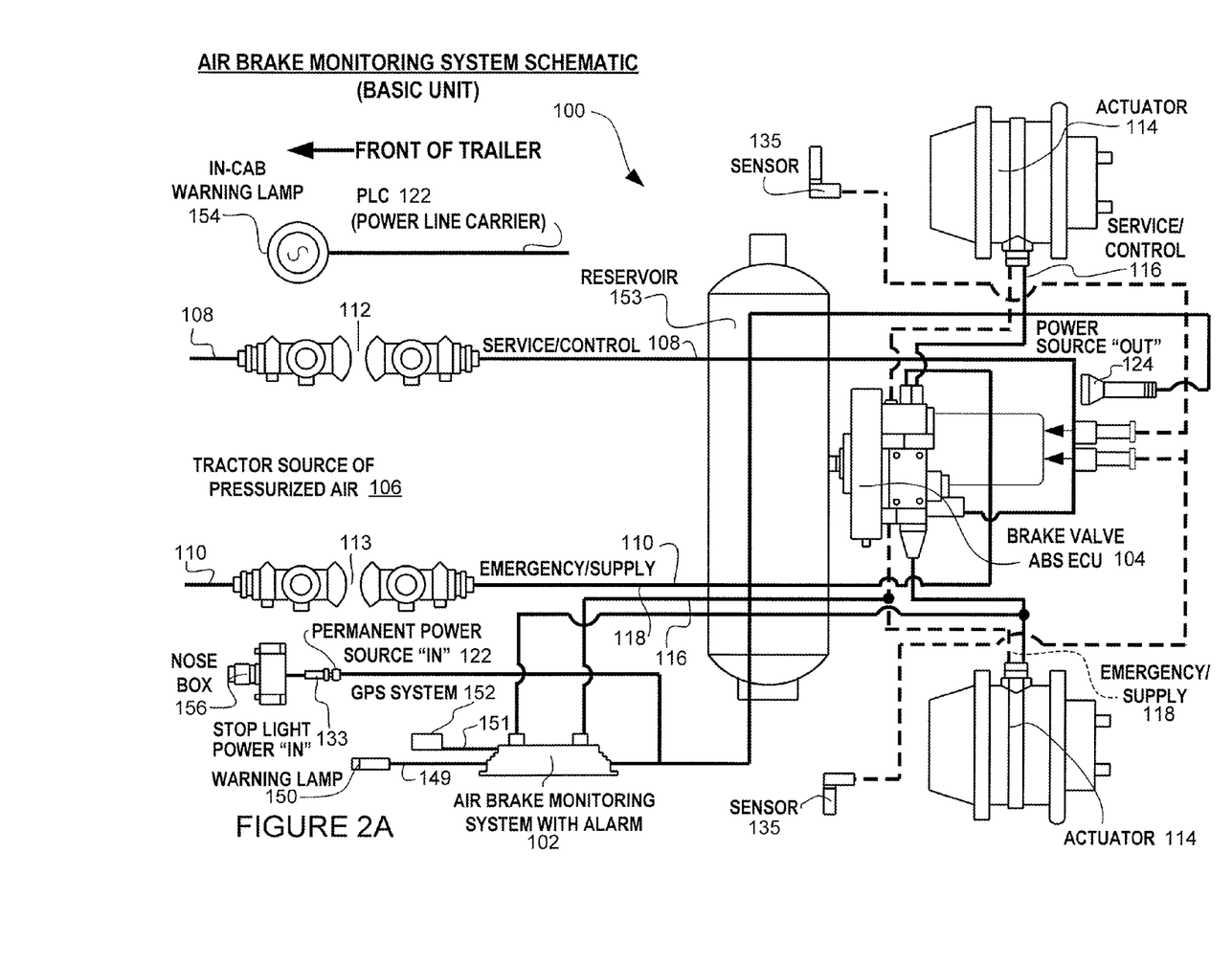
FIGS. 2A and 2B are diagrams of an air brake monitoring system in conjunction with the ABS.
Figure 2B:
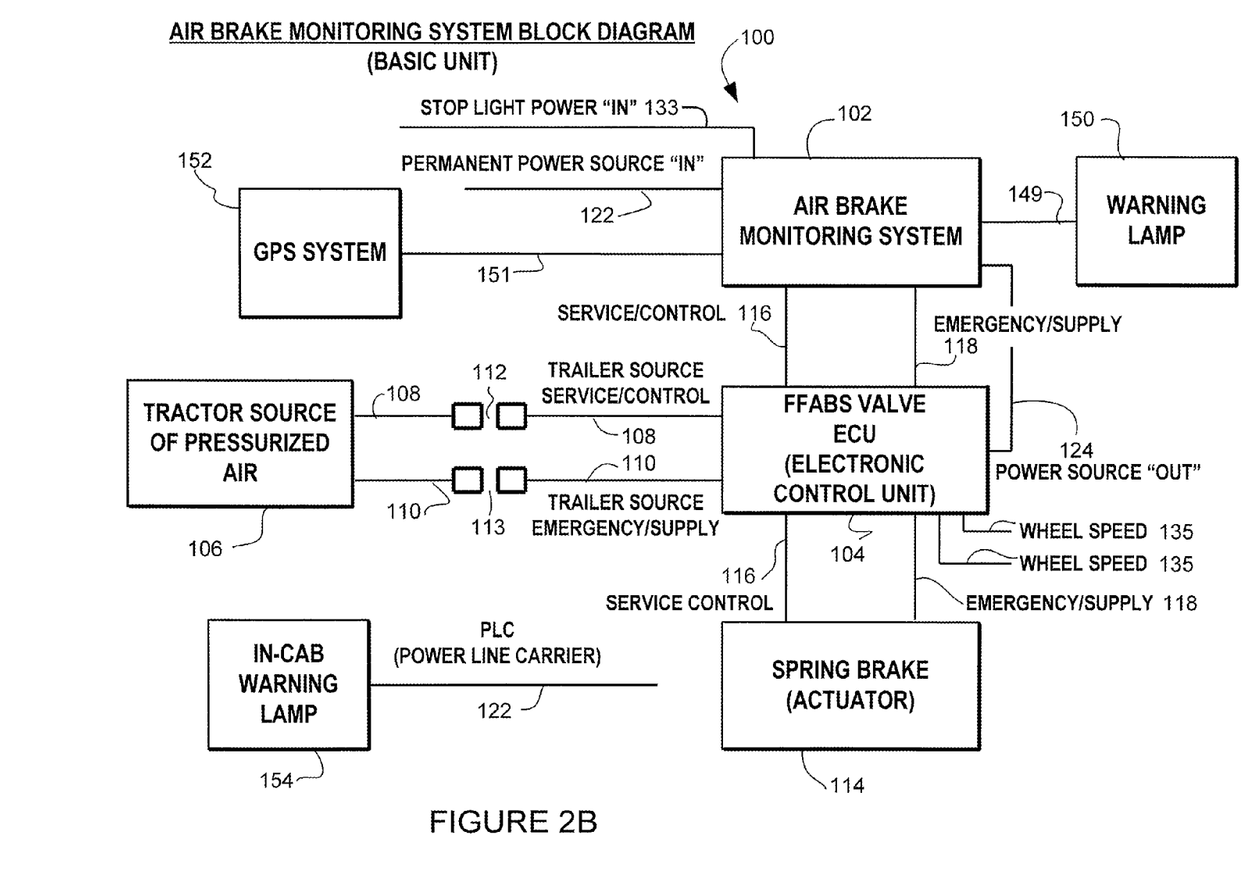

Referring now to FIGS. 2A and 2B. FIGS. 2A and 2B depict an air brake monitoring system 100 that generally comprises an air brake monitoring device 102 and a brake valve 104 that may include an Electronic Control Unit. The air brake monitoring system 100 is designed to monitor the status of a air brake system, such as, for example, an air brake system.

Also provided is a source of pressurized air 106, which may be positioned on the tractor portion of a tractor-trailer arrangement. The source of pressurized air 106 is coupled to brake valve 104 via service/control pressure line 108 and an emergency/supply pressure line 110. Pressure line couplings 112 and 113 as is known in the art, is illustrated that couples the service/control pressure line 108 and emergency/supply pressure line 110 located on the tractor portion with the service/control pressure line 108' and the emergency/supply pressure line 110' located on the trailer portion.

The brake valve 104 is positioned in the vicinity of the brake actuator (114) and is coupled to air brake monitoring device 102 via a device service/control pressure line 116' and a device emergency/supply pressure line 118'.

In this particular embodiment of the present invention, two pressure lines are used to provide pressurized air to brake valve 104. In the event that one of the pressure lines (116', 118') become damaged, such as for example, becoming severed or damages to the extent that an insufficient quantity of pressurized air cannot be transmitted to brake valve 104 for operation of the vehicle brake (not shown), a redundant pressure line is provided such that the vehicle may continue to operate as is known in the art. A problem with known systems is that they may become damaged but are still able to provide enough pressurized air to allow functioning of the vehicle brake, however, this is no indication to the user/driver that the system is not functioning properly. This can lead to premature failure of the brake system. For example, if a pressure line becomes damaged or begins to leak due to corrosion and/or wear, enough pressurized air may still be provided to operate the vehicle brake, however the relative low-pressure situation only partially disengages the vehicle brake such that during normal operation the brake is partially applied. This results in excessive wear on the brakes and excessive cycling (almost continuous running) of the source of pressurized air 106. Also, the vehicle itself will have to burn excessive amounts of fuel to overcome the additional frictional force of the partially applied brakes (e.g. brake drag and potential wheel end fire or even trailer fire). All these result in substantially increased operating cost, both in early and unnecessary repair and replacement cost for worn parts and additional fuel costs, insurance cost if trailer fire due to lose of trailer and the trailer contents which are a substantial portion of the vehicle operating costs.

Accordingly, the air brake monitoring device 102 monitors the actual pressure of both the device service/control pressure line 116, which corresponds to the pressure in the service/ control pressure line 108'; and the device emergency/supply pressure line 118, which corresponds to the pressure in the emergency/supply pressure line 110'. Air brake monitoring device 102 is provided with a pressure set point against which the actual measured pressures may be compared by a processor 120 (FIG. 4). It is contemplated that if the actual measured pressure differs from the set point, an alarm(s), in-cab trailer warning lamp 154, warning lamp 150 and GPS/wireless transmitter and/or receiver 152 messages may be generated. In still another embodiment, it is contemplated that a range of pressures may be acceptable such that an alarm will only be generated if the measured pressure exceeds a threshold value corresponding to a maximum allowable deviation. The threshold value may be selected and varied as desired.

Also provided in FIGS. 2A and 2B is power line carrier 122, which is connectable to air brake monitoring device 102. It is contemplated that power line carrier 122 may comprise any typical ABS power connection. Air brake monitoring device 102 may further monitor stoplight power (voltage) provided on stoplight power 133 and compare that measured value to the service/control pressure. If the actual measured value differs from or exceeds a maximum allowable deviation, an alarm(s), in-cab trailer warning lamp 154, warning lamp 150 and GPS/wireless transmitter and/or receiver 152 messages may be generated. Air brake monitoring device 102 is further coupled to brake valve 104 via device power line 124 (which includes stoplight power 133) to provide electrical power and control to and receive data and/or information from brake valve 104.

In another advantageous embodiment a method for monitoring an air brake system is provided comprising the steps of monitoring the individual wheel speeds or wheel rotations on the power line. The method also includes controlling in-cab lamp trailer ABS lamp, the trailer mounted ABS lamp and alarm as well as GPS or other wireless means based on the static or dynamic condition of the vehicle. Finally, the method includes the steps of measuring the vehicle dynamics in conjunction with a pressure of the service/control pressure line, comparing the measured pressure to a pressure set point, and generating a service/control indication when the measured pressure exceeds a threshold value corresponding to a deviation from the pressure set point.

In another advantageous embodiment a method for monitoring an air brake system is provided comprising the steps of monitoring the individual wheel speeds or wheel rotations on the power line. The method also includes controlling in-cab lamp trailer ABS lamp, the trailer mounted ABS lamp and alarm as well as GPS or other wireless means based on the static or dynamic condition of the vehicle. Finally, the method includes the steps of measuring the vehicle dynamics in conjunction with a pressure of the emergency/supply pressure line, comparing the measured pressure to a pressure set point, and generating an emergency/supply indication when the measured pressure exceeds a threshold value corresponding to a deviation from the pressure set point.

Integrated within ABS

Figure 3A:
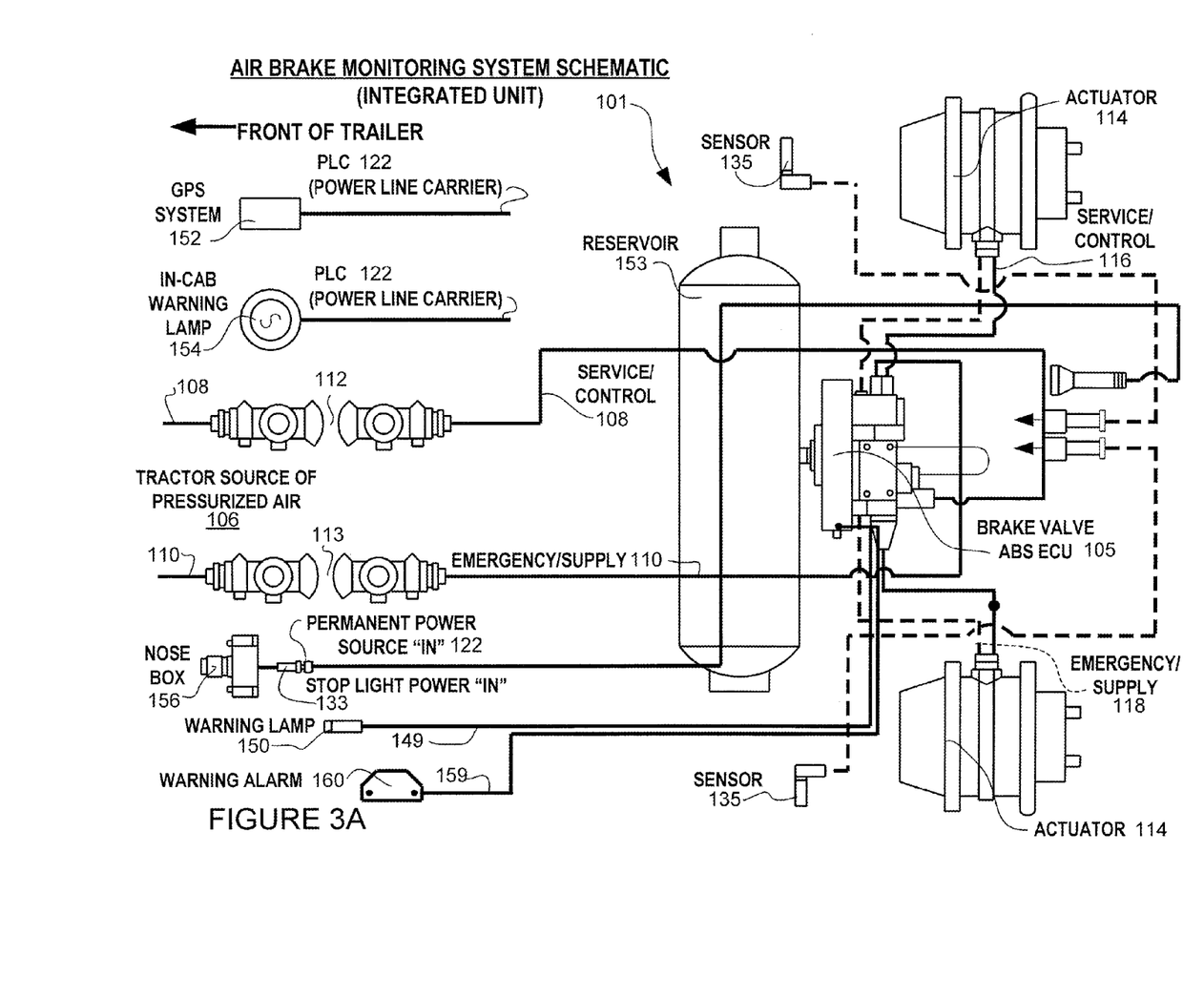
FIGS. 3A and 3B are diagrams of an air brake monitoring system integrated within the ABS as auxiliary inputs and outputs.
Figure 3B:
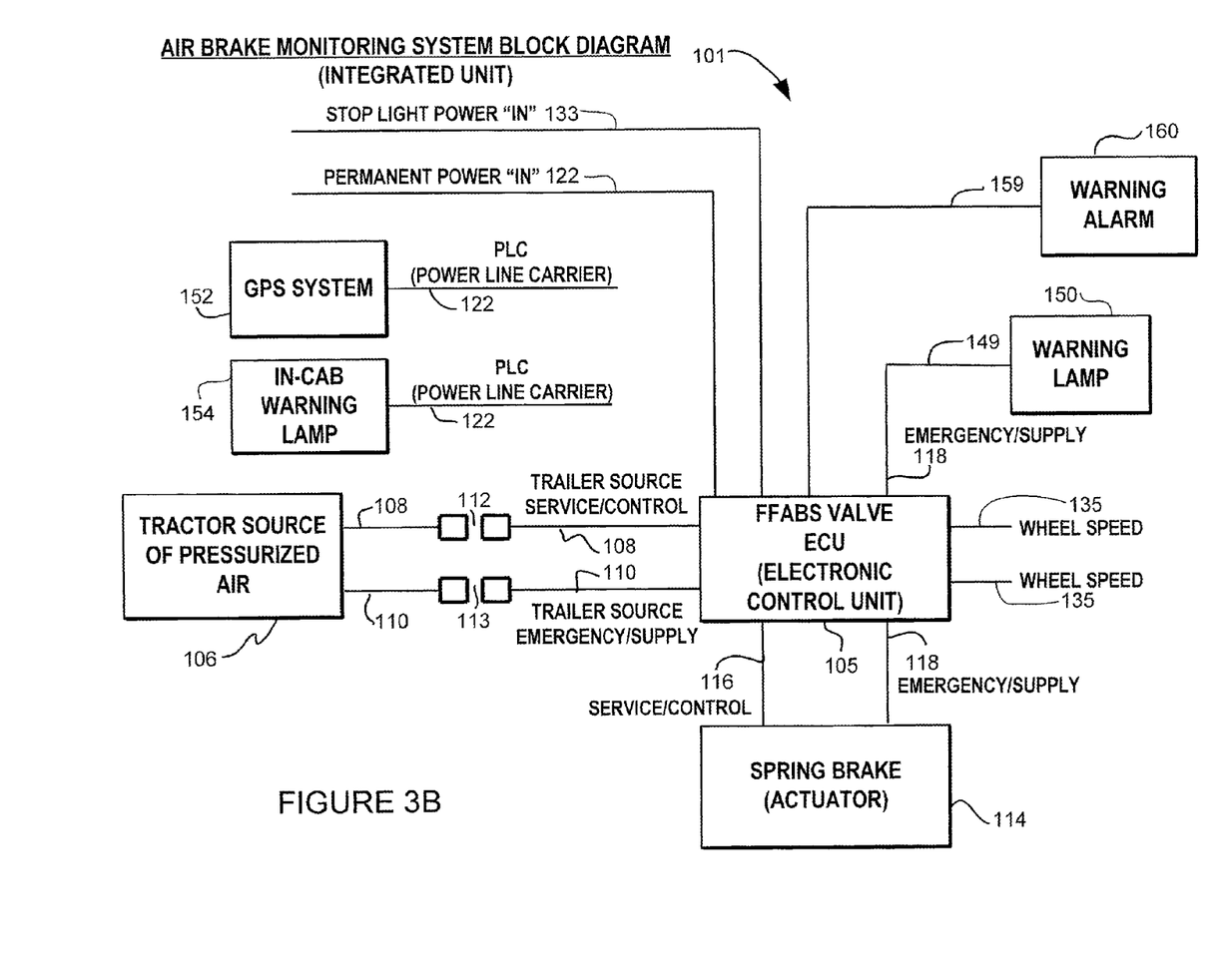

Referring now to FIGS. 3A and 3B. FIGS. 3A and 3B depict an air brake monitoring system 101 that generally comprises and an integrated brake valve 105 that integrates the ABS Electronic Control Unit, brake valve 104 with the air brake monitoring system 102. The brake valve 105 designed to monitor the status of a air brake system, such as, for example, an air brake system.

Also provided is a source of pressurized air 106, which may be positioned on the tractor portion of a tractor-trailer arrangement. The source of pressurized air 106 is coupled to integrated brake valve 105 via service/control pressure line 108 and an emergency/supply pressure line 110. Pressure line couplings 112 and 113 as is known in the art, is illustrated that couples the service/control pressure line 108 and emergency/supply pressure line 110 located on the tractor portion with the service/control pressure line 108' and the emergency/supply pressure line 110' located on the trailer portion.

The integrated brake valve 105 is positioned in the vicinity of the brake actuator (114) and is coupled to the service/control pressure line 116 and a device emergency/supply pressure line 118.

In this particular embodiment of the present invention, two pressure lines are used to provide pressurized air to integrated brake valve 105. In the event that one of the pressure lines (116, 118) become damaged, such as for example, becoming severed or damages to the extent that an insufficient quantity of pressurized air cannot be transmitted to brake valve 105 for operation of the vehicle brake (not shown), a redundant pressure line is provided such that the vehicle may continue to operate as is known in the art. A problem with known systems is that they may become damaged but are still able to provide enough pressurized air to allow functioning of the vehicle brake, however, this is no indication to the user/driver that the system is not functioning properly. This can lead to premature failure of the brake system. For example, if a pressure line becomes damaged or begins to leak due to corrosion and/or wear, enough pressurized air may still be provided to operate the vehicle brake, however the relative low-pressure situation only partially disengages the vehicle brake such that during normal operation the brake is partially applied. This results in excessive wear on the brakes and excessive cycling (almost continuous running) of the source of pressurized air 106. Also, the vehicle itself will have to burn excessive amounts of fuel to overcome the additional frictional force of the partially applied brakes (e.g. brake drag and potential wheel end fire or even trailer fire). All these result in substantially increased operating cost, both in early and unnecessary repair and replacement cost for worn parts and additional fuel costs, insurance cost if trailer fire due to lose of trailer and the trailer contents which are a substantial portion of the vehicle operating costs.

Accordingly, the integrated brake valve 105 monitors the actual pressure of both the device service/control pressure line 116, which corresponds to the pressure in the service/control pressure line 108'; and the device emergency/supply pressure line 118, which corresponds to the pressure in the emergency/supply pressure line 110'. Air brake monitoring device 102 is provided with a pressure set point against which the actual measured pressures may be compared by a processor 120 (FIG. 4). It is contemplated that if the actual measured pressure differs from the set point, an alarm(s), in-cab trailer warning lamp 154, warning lamp 150 and GPS/wireless transmitter and/or receiver 152 messages may be generated. In still another embodiment, it is contemplated that a range of pressures may be acceptable such that an alarm will only be generated if the measured pressure exceeds a threshold value corresponding to a maximum allowable deviation. The threshold value may be selected and varied as desired.

Also provided in FIGS. 3A and 3B is power line carrier 122, which is connectable to the integrated brake valve 105. It is contemplated that power line carrier 122 may comprise any typical ABS power connection. The integrated brake valve 105 may further monitor an actual power level (voltage) provided on power line carrier 122 and compare that measured value to a set point. The integrated brake valve 105 may further monitor stoplight power (voltage) provided on stoplight power 133 and compare that measured value to the service/control pressure. If the actual measured value differs from or exceeds a maximum allowable deviation, an alarm(s), in-cab trailer warning lamp 154, warning lamp 150 and GPS/wireless transmitter and/or receiver 152 messages may be generated. The integrated brake vale 105 is further coupled to a device power line 122 to provide electrical power and control to and receive data and/or information from power line carrier 122.

Figure 4B:
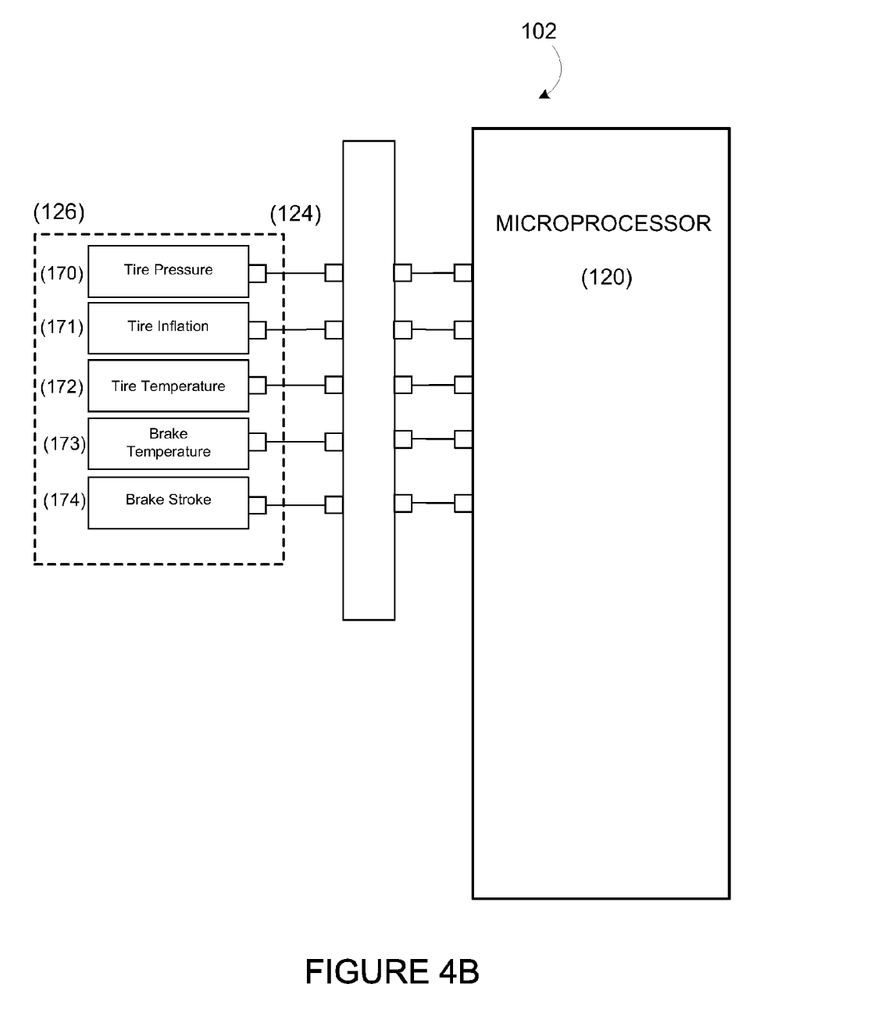
FIG. 4B is a block diagram of various warning inputs according to FIG. 4A.

Referring now to FIGS. 4A and 4B, various alarms are illustrated that may be generated and transmitted to various systems, both in-cab warnings 126 and other system warnings 128 based on input configurations on 186. For example, in the event that a low-pressure situation is detected (e.g. a known pressure range may equate to an operational brake system but will be known to cause brake drag) within a range of pressures, a brake drag warning 130. It is contemplated that a brake drag warning 130 may be transmitted to a user/driver in the cab of the tractor-trailer or may also be transmitted to a central monitoring station. The indication may be a hard-wired data connection, a wireless transmission or a power line connection for transmitting the data.

Additionally, the pressure in the service/control pressure line 108,108' and the pressure in the emergency/supply pressure line 110, 110' may individually be measured. This allows for both a service/control pressure warning 132 and an emergency/supply pressure warning 134 to be generated and transmitted to the user/driver and may be generated/transmitted as described above.

Also provided for are various additional warnings or alarms including, an incorrect connection warning 135, a closed service/control valve warning 136, a closed emergency/supply warning 137, no stoplight power warning 138, alarm 160, an ABS in-cab warning lamp 131 as well as a Trailer ABS Warning Lamp 150. As the brake system is serviced and/or repaired, it is possible to reconnect the various pressure lines incorrectly. By measuring the various pressures, air brake monitoring device 102 is able to determine if a pressure line(s) are incorrectly connected to the brake valve 104. It is further contemplated that the position of the brake valve 104 may be measured and this data and/or information may be transmitted to a warning device 126 via device power line 122 such that a warning or alarm may be generated in the event the valve fails to actuate as designed. All of these indications may be generated/transmitted as described above.

Additional parameters that may be monitored and various indications may be generated include: tire pressure 170, tire inflation 171, tire temperature 172, brake temperature 173, and brake stroke 174. The indication may be provided as an alarm, a warning lamp, a wireless message, a signal, or any combination thereof. It is also contemplated that control for a backup alarm may be provided such that a backup indication is generated and transmitted. In one embodiment, different transmission paths for the indication and backup indication may be used to ensure delivery of the indication. The system could utilize two wired transmission paths, or wireless transmission, or power line connection as desired to ensure reliable transmission. It is understood that the transmission method can be selected based on the application.

It is still further contemplated that the existing ABS alarms that may be transmitted from the brake valve (ABS brake valve), may effectively be transmitted to the cab via device power line 122 to air brake monitoring device 102 and through power line carrier 122.

It is still further contemplated that the existing ABS information that may be transmitted from the brake valve (ABS brake valve), may effectively be transmitted by means of a wireless communication device 152. Air brake monitoring device 102 and through power line carrier 122 on power line 122.

It is still further contemplated that the existing ABS information that may be transmitted from the brake valve (ABS brake valve), may effectively be transmitted by means of a wireless communication device 152. Air brake monitoring device 102 and through a Universal Serial Bus (USB) or Recommended Standard 232 (RS232) serial port to a wireless communication device.

Although the invention has been described with reference to a particular arrangement of parts, features and the like, these are not intended to exhaust all possible arrangements or features, and indeed many other modifications and variations will be ascertainable to those of skill in the art.

Figure 5:
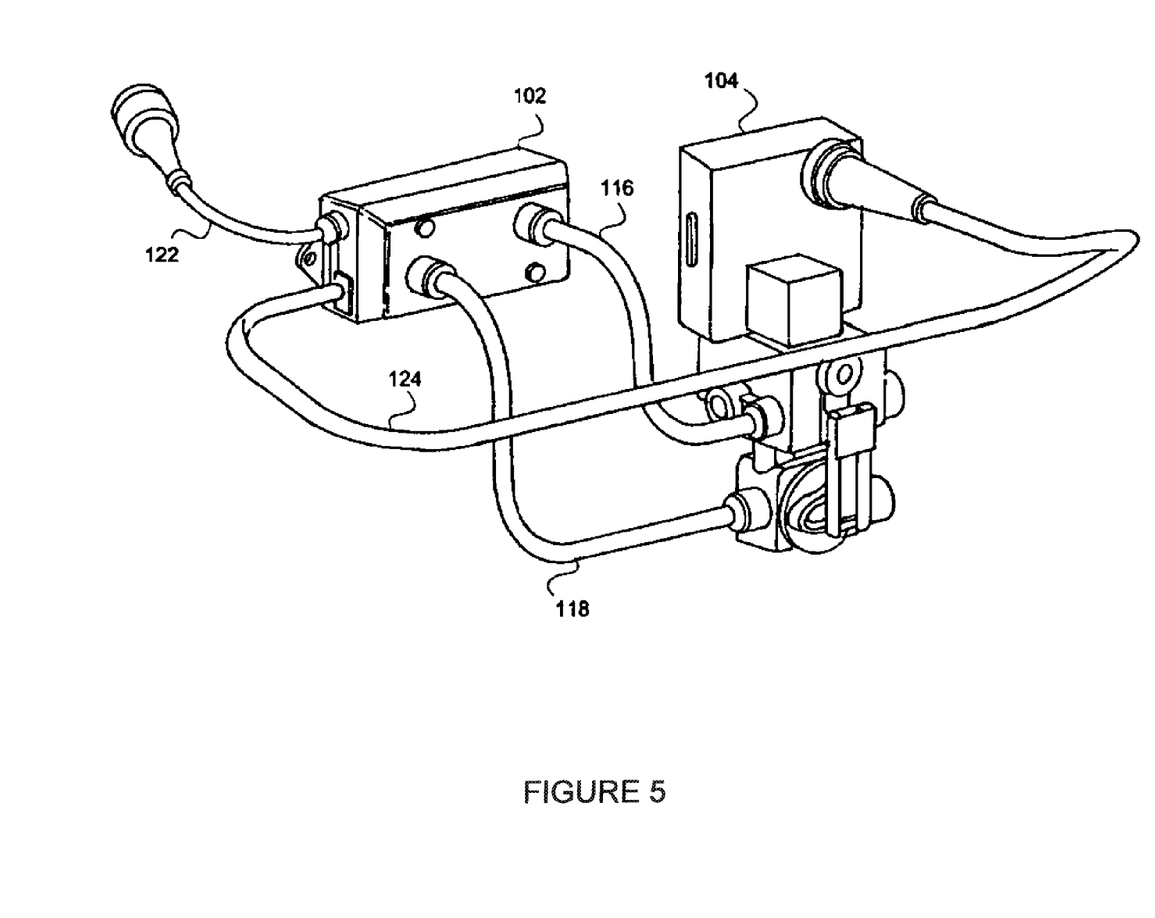
FIG. 5 is an illustration of an advantageous embodiment of the invention.

Referring to FIG. 5, it can be seen that brake monitoring device 102 is mounted in the vicinity of brake valve 104 and is provided to retrofit with existing brake systems while requiring no additional wiring to extend between the tracker and trailer. For example, the monitoring alarms that may be generated and transmitted by the system utilized the existing power line carrier 122 extending between the tractor and trailer. The existing power line carrier 122 that is coupled to the existing brake valve 104 may simply be unplugged from brake valve 104 and plugged into air brake monitoring device 102. The device power line 124 is then plugged into the brake valve 104. Likewise, the device control and device emergency/supply pressure lines 116, 118 are simply coupled to the existing brake valve 104. In this manner, the monitoring system may use existing wiring and pressure connections such that no new connections need be installed between the tractor and trailer combination.

A method is further provided for monitoring the individual wheel speeds or wheel rotations 135 which is available on the power line. The method also includes controlling in-cab lamp trailer ABS lamp, the trailer mounted ABS lamp and alarm as well as GPS or other wireless means based on the static or dynamic condition of the vehicle. Finally, the method includes the steps of measuring the vehicle dynamics in conjunction with a pressure of the service/control pressure line, comparing the measured pressure to a pressure set point, and generating a service/control indication when the measured pressure exceeds a threshold value corresponding to a deviation from the pressure set point.

Another method is provided for monitoring the individual wheel speeds or wheel rotations 135 which is available on the power line. The method also includes controlling in-cab lamp trailer ABS lamp, the trailer mounted ABS lamp and alarm as well as GPS or other wireless means based on the static or dynamic condition of the vehicle. Finally, the method includes the steps of measuring the vehicle dynamics in conjunction with a pressure of the emergency/supply pressure line, comparing the measured pressure to a pressure set point, and generating an emergency/supply indication when the measured pressure exceeds a threshold value corresponding to a deviation from the pressure set point.

Still another method is provided for monitoring the stoplight power 133. The air brake system is provided comprising the steps of monitoring the stoplight power. The method also includes controlling in-cab lamp trailer ABS lamp, the trailer mounted ABS lamp and alarm as well as GPS or other wireless signals based on the presence of stoplight power in conjunction with a pressure of the service/control pressure line, comparing the measured pressure to a pressure set point, and generating a service/control indication when the measured pressure exceeds a threshold value corresponding to a deviation from the pressure set point.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

It is understood that any or all of the indications and/or alarms generated by the system may be provided to the cab of the vehicle and may also be transmitted to a central monitoring station, whether immediately or at a later time when the vehicle arrives at a specified location. For example, data may be stored locally and automatically be transmitted or read at a later time.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A brake monitoring system comprising:
   a service/control pressure line;
   an emergency/supply pressure line;
   a brake valve coupled to a brake actuator and operating the brake actuator, said brake valve coupled to the service/control pressure line and the emergency/supply pressure line, the service/control pressure line and the emergency/supply pressure line each being configured to provide pressurized air to the brake valve;
   a brake monitoring device having a processor and coupled to the service/control pressure line and the emergency/supply pressure line, the monitoring device monitoring the pressure of both the service/control pressure line and the emergency/supply pressure line;
   said processor comparing the measured pressure of said service/control pressure line and said emergency/supply pressure line to a pressure set point; and
   said brake monitoring device generating an indication based on the measured pressure;
   said indication is transmitted as: a hard-wired data connection, a wireless transmission, an electrical power line connection or combinations thereof,
   said indication presented as either an alarm, or a warning lamp, or a message, or combinations thereof.

2. The brake monitoring system according to claim 1 further comprising a vehicle wheel speed measurer for measuring vehicle wheel speed.

3. The brake monitoring system according to claim 1 wherein said brake valve is coupled to said brake monitoring device and a warning indication is generated for at least one of the following conditions: brake drag warning, emergency/supply pressure line warning, service/control pressure line warning, loss of stoplight power warning, incorrect state of trailer glad-hand shut off valves warning, incorrect dolly connection warning, incorrect air connection warning and closed brake valve warning and incorrect vehicle static/dynamic condition.

4. The brake monitoring system according to claim 3 wherein said warning signal is transmitted to at least one vehicle warning indicator via a power line.

5. The brake monitoring system according to claim 3 further comprising a backup warning indication generated for the at least one condition.

6. The brake monitoring system according to claim 1 wherein said monitoring system receives a tire inflation signal from a tire inflation measurement device.

7. The brake monitoring system according to claim 6 wherein a warning indication is generated if the tire inflation signal exceeds a threshold level.

8. The brake monitoring system according to claim 7 wherein the threshold level is selected from the group consisting of: a specified level of tire pressure, a duration of tire inflation, a frequency of a measured tire pressure is below a specified level.

9. The brake monitoring system according to claim 1 further comprising a measurement device for measuring at least one of the following tire parameters: tire pressure, tire temperature and tire inflation.

10. The brake monitoring system according to claim 9 wherein the measurement device generates a signal indicative of the measured parameter and the measurement device comprises one of: a wired device or a wireless device.

11. The brake monitoring system according to claim 1 further comprising a measurement device for measuring at least one of the following parameters: brake temperature monitoring or brake stroke monitoring.

12. The brake monitoring system according to claim 1 wherein when said warning indication comprises a signal, the signal is transmitted via a power line.

13. A brake monitoring system comprising:
   a service/control pressure line;
   an emergency/supply pressure line;
   a brake valve coupled to a brake actuator and operating the brake actuator, said brake valve coupled to the service/control pressure line and the emergency/supply pressure line, the service/control pressure line and the emergency/supply pressure line each being configured to provide pressurized air to the brake valve;
   a monitoring device having a processor and coupled to the service/control pressure line and the emergency/supply pressure line, the monitoring device monitoring the pressure of both the service/control pressure line and the emergency/supply pressure line;
   wherein said monitoring device is coupled to a measurement device and said processor compares the pressure in the emergency/supply pressure line and the service/control pressure line to a set point and said monitoring device generates a warning indication for at least one of the following conditions: brake drag warning, emergency/supply pressure line warning, service/control pressure line warning, loss of stoplight power warning, incorrect state of trailer glad-hand shut off valves warning, incorrect dolly connection warning, incorrect air connection warning, closed brake valve warning, incorrect vehicle static/dynamic condition, tire pressure warning, tire temperature warning, tire inflation warning, brake temperature warning, and brake stroke warning;
   said indication is transmitted as: a hard-wired data connection, a wireless transmission, an electrical power line connection or combinations thereof,
   said indication presented as either an alarm, or a warning lamp, or a message, or combinations thereof.

14. The brake monitoring system according to claim 13 wherein the measurement device comprises one of: a wired device or a wireless device.

15. The brake monitoring system according to claim 13 further comprising a backup warning indication generated for the at least one condition.

16. The brake monitoring system according to claim 13 wherein said brake valve is coupled to said brake monitoring device and a warning indication is generated for at least one of the following conditions: brake drag warning, emergency/supply pressure line warning, service/control pressure line warning, loss of stoplight power warning, incorrect state of trailer glad-hand shut off valves warning, incorrect dolly connection warning, incorrect air connection warning and closed brake valve warning and incorrect vehicle static/dynamic condition.

* * * * *